Dec. 8, 1964  G. G. FERRARO ETAL  3,160,255
FOOD VENDING MACHINE
Filed May 24, 1962  2 Sheets-Sheet 1

INVENTORS
George G. Ferraro
Angelo J. Ferraro
BY
Charles L. Lorenbach
ATTORNEY

Dec. 8, 1964   G. G. FERRARO ETAL   3,160,255
FOOD VENDING MACHINE

Filed May 24, 1962   2 Sheets-Sheet 2

INVENTORS
George G. Ferraro
BY Angelo G. Ferraro

Charles L. Lovercheck
ATTORNEY

United States Patent Office 3,160,255
Patented Dec. 8, 1964

3,160,255
FOOD VENDING MACHINE
George G. Ferraro, 1321 W. 36th St., Erie, Pa., and Angelo J. Ferraro, 47 Huron St., Guelph, Ontario, Canada
Filed May 24, 1962, Ser. No. 197,510
2 Claims. (Cl. 194—1)

This invention relates to food vending machines and, more particularly, to sandwich and pizza vending machines.

This application is a continuation in part of patent application, Serial No. 56,061, filed September 14, 1960, now abandoned.

The general objects of the present invention are to provide a food vending machine which is economical to fabricate, simple and economical to maintain, adapted to vend a variety of food products, and convenient and accommodating to popular appeal.

The machine may be assembled on a mass production basis and is sturdy and durable. It is capable of a long service life of severe usage and manipulation. It can effectively perform the heating and vending processes of food products with uniformity which is possible with an electronic control center. It permits thorough heating of prepackaged food products in a predetermined short period of time and substantially increases the mechanical efficiency with minimum inclusion of three moving mechanical embodiments therein.

A more specific object of the present invention is to provide a vending machine with an apportioned cabinet. The cabinet has a refrigerated portion for preserving the food products and an unrefrigerated portion. The unrefrigerated portion contains a standard heating lamp of high intensity to thoroughly heat the food product in a predetermined short period of time. A rotatable assembly is also contained which will move and dispense the processed product in a semi-circular direction therefrom.

Another object of the present invention is to provide a vending machine with an elevator contained within the refrigerated portion of the cabinet powered by an electric motor with a sprocket and elevator chain attached thereto. The elevator lifts the packaged products stacked on a square elevator plate. The packaged food is stacked along a guideway below a square or rectangular opening in the unrefrigerated portion. A rotatable mechanism actuated by the electronic control center carries out the heating and dispensing process therewith.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
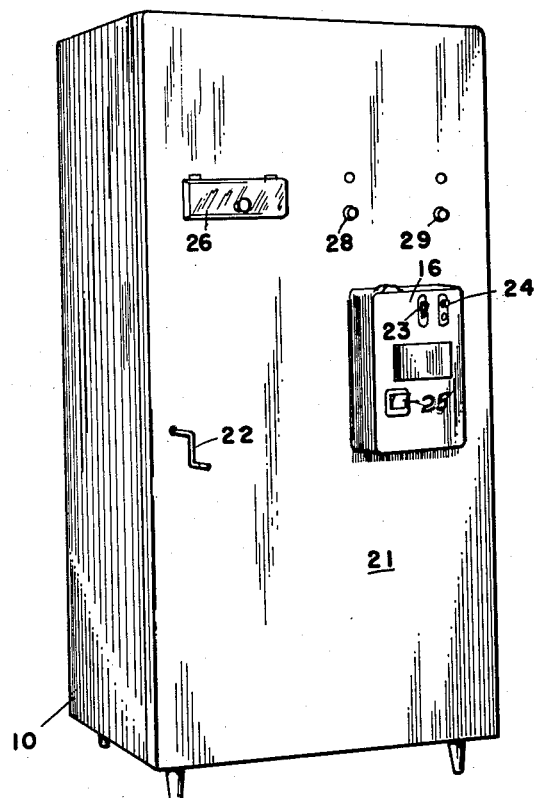
FIG. 1 is an isometric front view of a vending machine according to the invention.

Now with more particular reference to the drawings, the machine shown is generally made of a cabinet 10 having a platform 12 which is located approximately three-fourths of the way from the bottom to the top thereof. This divides the cabinet into a refrigerator compartment below and a non-refrigerated compartment above the platform.

The purpose of the invention is to provide a machine which is actuated by coins dropped into a coin box 16 to actuate a circuit which will drive a mechanism. The mechanism will carry one or the other of actual food members 17 or 18 up to the top of the platform 12. The food will be moved into position between two heat lamps 14 and 20. It will be heated by the lamps 14 and 20 and moved around to a discharge position.

The cabinet 10 will be of the ordinary insulated type having a door 21 which may be locked by a suitable removable locking crank 22. The door 21 has the coin box 16 mounted on it which has a suitable slot 23 for receiving coins in the usual manner. A coin return button 24 is provided to return the coins through a slot 25. This coin mechanism is familiar to those skilled in the art.

A small access door 26 is hinged at its top to the door 21 so that its weight will normally swing it to closed position. The bottom part of the door 26 is generally flush with the top surface of the platform 12 so that food slid around on the platform 12 and heated will be readily accessible through the door 26.

Push buttons 28 and 29 are provided on the door 21. These two push buttons actuate either one or the other elevating mechanisms to index the food products 17 or 18 selectively upward.

The cabinet 10 may contain a refrigeration unit 15 which will maintain the portion of the cabinet below the platform 12 at a low temperature.

The elevating mechanism is made of angular guide members 31 which are attached to the lower ends of the bottom of the refrigerator cabinet. The upper ends are attached to the platform 12 so that they provide elongated guiding trackways for the package food products 17 and 18. The food products 17 and 18 may be pizza pies, sandwiches, or the like package in containers which has a transparent cover over the top and bottom thereof. Thus, when a package is brought between the lamps 14 and 20, the infrared heat waves from the lamps will enter the package and cook the food product therein.

The food products 17 and 18 are each supported on one of the movable plate like platforms 32 and 33. These platforms are in the form of rectangular plates whose corners slide in the corner space between the legs of the angular members 31. The platforms 32 and 33 are supported on downwardly extending angle struts 34 and 35, respectively, which are welded to bosses 36 and 37 respectively. These bosses are bored to slide on cylindrical rod tracks 38 and 39 respectively. The cylindrical rod tracks are welded to the frame at the bottom and to the platform 12.

The elevator is operated by a motor 40 which drives a chain 41. The chain 41 passes around an idler sprocket 42 at the bottom and around the sprocket on the motor shaft. The chain 41 is attached to the boss 36 at one point so that as the chain is rotated counterclockwise by the motor 40, the platform is lifted. The platform 33 is similarly moved by a motor 43 and a chain 44 passing over an idler sprocket 45.

Figure 2:
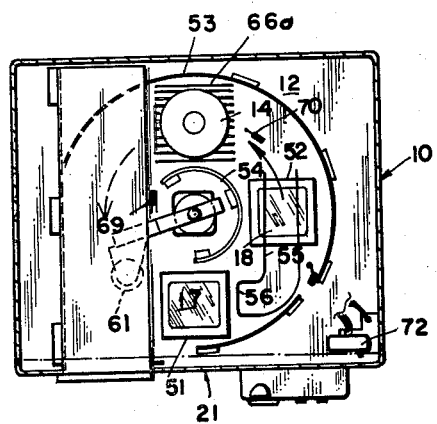
FIG. 2 is a cross sectional view taken on line 2—2 of FIG. 3.
Figure 3:
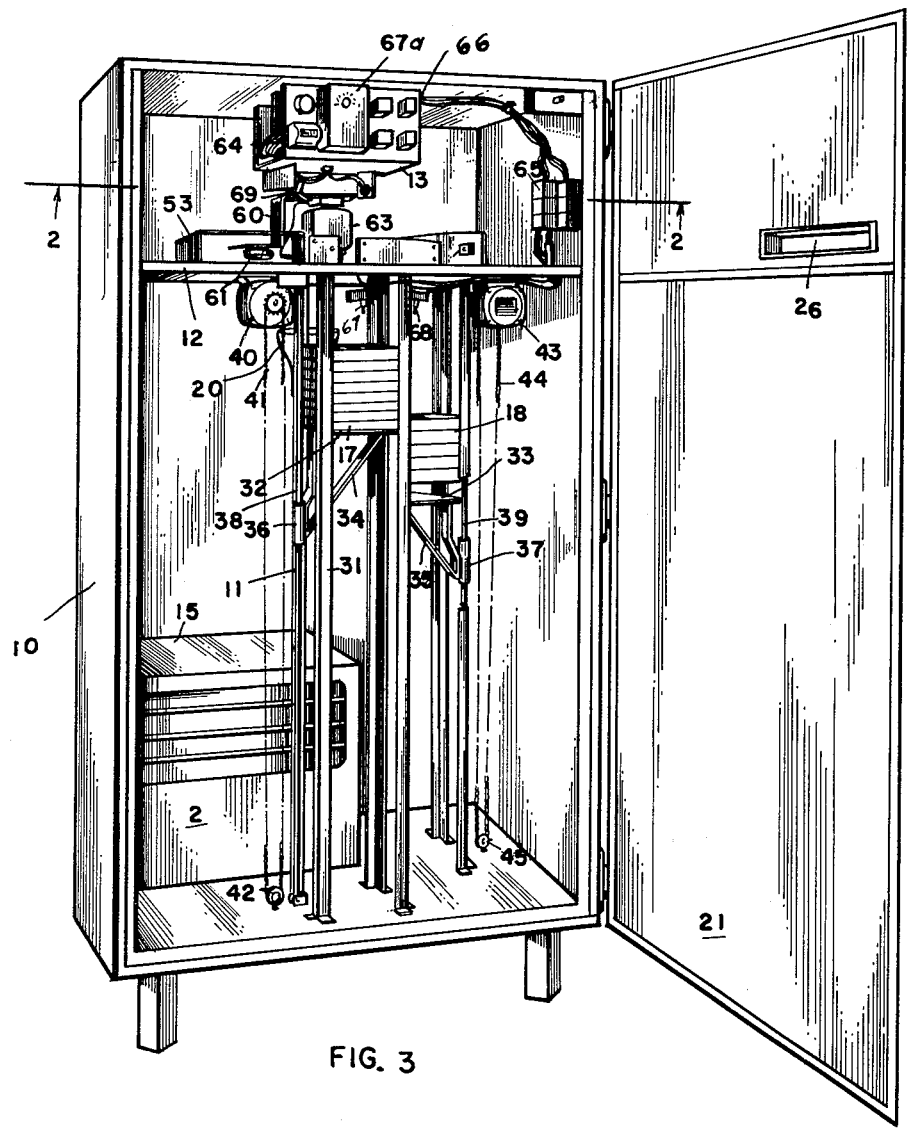
FIG. 3 is a view similar to FIG. 1 with the door of the machine open.

The top of the platform 12 and associated equipment are best shown in FIG. 2. The edges are welded or otherwise fixed to the inside of the cabinet 10 around the entire peripheral edge to support it and separate the lower refrigerated compartment from the upper compartment. The platform 12 has an opening 51 directly over the platform 32 having the packaged food products 17 resting thereon. Another opening 52 is directly formed in the platform over the food products 18.

A circular guide track 53 is welded to the platform and an inner track provides an inner annular flange 54 at the center. An arm 60 having a roller 61 thereon is swung around the base between the outer track and the inner track by a motor 63. The track has spaced flexible relient rod members 55 in the form of heavy wire fixed to the platform at their ends 56. The rod members 55 overlie the opening 52 so that if a food product 17 is selected and lifted up above the platform, it will slide over the rod members 55 and over the opening 52. The customer could select the product 18 by pressing the button 29.

The rod members 55 will raise to allow the products 18 to move up onto the platform 12 in the path of the roller 1. The moving mechanism is made up of the motor 63 which is fixed to the platform 12. The motor 63 has an upwardly extending shaft which is fixed to the arm 60. The motor 63 rotates the arm 60 through one complete revolution each time either of the buttons 28 or 29 is pressed. The arm 60 extends laterally from the motor 3, then downwardly as shown, and then laterally between the inner and outer tracks so that the food products are indexed around the track from the elevator by the arm 60.

A counting mechanism 64 is affixed to the control arrangement so that it will count the number of packages of food that are dispensed by the machine. A plug arrangement 65 is provided as a junction between the motors and the control arrangement at 66.

The control arrangement is made up of limit switches 7 and 68 which engage the food products each time they move upwardly. A limit switch 69 is actuated by an arm which engages the arm 60 when the arm comes to rest at the end of the cycle. The limit switch 69 stops the arm when the food product comes into position between the heat lamps 14 and 20. A safety switch 70 is provided which turns the entire mechanism off when the door is open.

In operation, the food products 17 and 18 are stacked in the plate like platform 32 and 33, respectively. When a customer presses one of the buttons 28 or 29; for example, the push button 28, the elevating mechanism driven by the motor 40 will drive the platform 32 upward the distance equal to the height of one of the packages thereon. When this food product has reached the top of its travel, it will engage the limit switch which will stop the motor 40 and start the motor 63.

The motor 63 will drive the arm 60 around, causing the roller 61 to move the food product 17 around the inside of the outside track 53 until it comes between the heat lamps 14 and 20. Here, arm 60 will engage a switch which will stop the motor 63. The food product will be supported over the opening in the platform 12 by a grid and 66a. Heat lamps 14 and 20 will be turned on and the timer will be started. A timer 67a will then start the motor 63 after a predetermined time after the heat lamps are turned on and the lamps will be turned off. The heat lamps will heat the food product.

When the motor 63 is started, it will drive the arm 60 around until it engages the limit switch 69 which will stop. At this position, the food product will be just inside the door 26 and the operator can open the door and reach in to get the food product.

When the button 29 is pressed, the action of the platform 33 and motor 43 will be similar and one of the food products 18 will be moved up ahead of the roller 61. It will be driven forward and the food product 18 will be heated in a similar manner.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A dispensing machine comprising a case having an apertured partition therein dividing said case into a refrigerated lower compartment and a heated upper compartment, a circular track on the top of said partition, an elevator for supporting food products, means to index said elevator selectively to bring one of said food products through said aperture of said partition each time said machine is actuated, said aperture lying between said tracks, an arm, means between said partition to move said food product over said partition when said elevator is above said partition, spaced theat lamps, means to move said food product up onto said partition between said heat lamps, timer means for controlling said heat lamps to heat them for a predetermined time, and means to move said food product from between said heat lamps to a dispensing position after said food product has been between said heat lamps for a predetermined time.

2. A dispensing means for food products comprising a case having an apertured partition therein dividing said case into an upper and a lower compartment, a circular track on the top of said partition, elevating means below said partition for supporting stacked food products, a driving means for said elevating means for moving said elevating means upward to bring one said food products through the aperture of said partition each time said machine is actuated, an annular track on said partition, said aperture lying between said tracks, a heating lamp above said partition and another heating lamp below said partition comprising a heating station, a motor above said partition, an arm attached to said motor, said arm having means extending between said tracks for pushing one of said products, a control circuit having means to stop said elevating means when said food product is brought up above said partition, means to start said motor whereby said arm moves said food product between said lamps, means to stop said arm when said food product is moved between said lamps for a predetermined time, and means in said circuit to drive said motor to move said arm to move said food product from between said lamps to a dispensing position after said predetermined time.

References Cited in the file of this patent
UNITED STATES PATENTS

| | | |
|---|---|---|
| 2,455,976 | Caruso | Dec. 14, 1948 |
| 2,834,510 | Cenotti | May 13, 1958 |
| 2,936,722 | Skarin | May 17, 1960 |
| 2,950,024 | Adler | Aug. 23, 1960 |